United States Patent Office 3,302,763
Patented Feb. 7, 1967

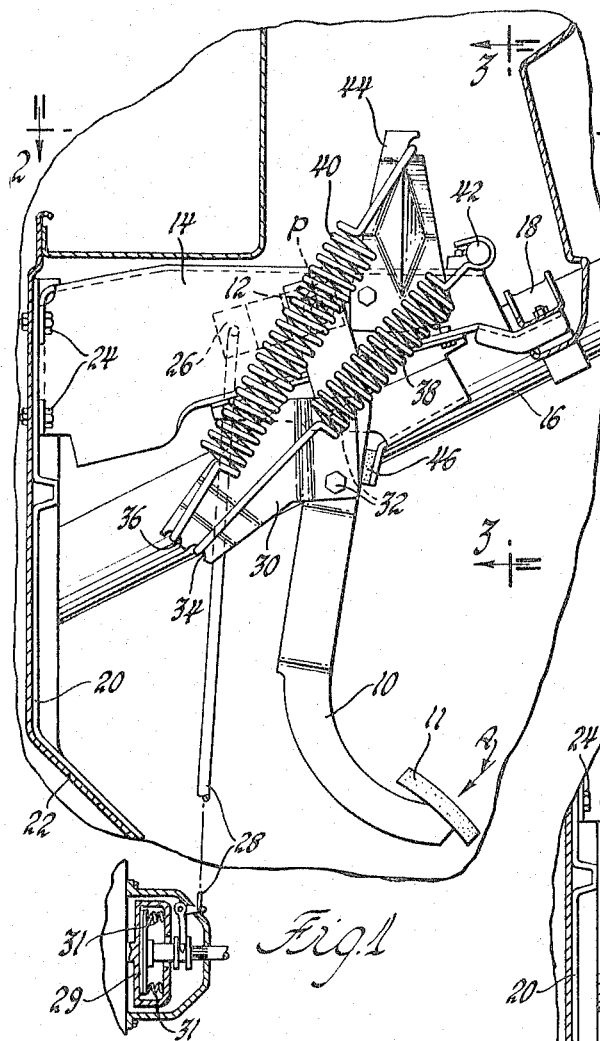
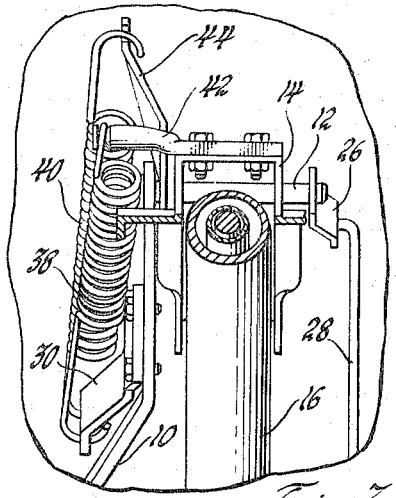
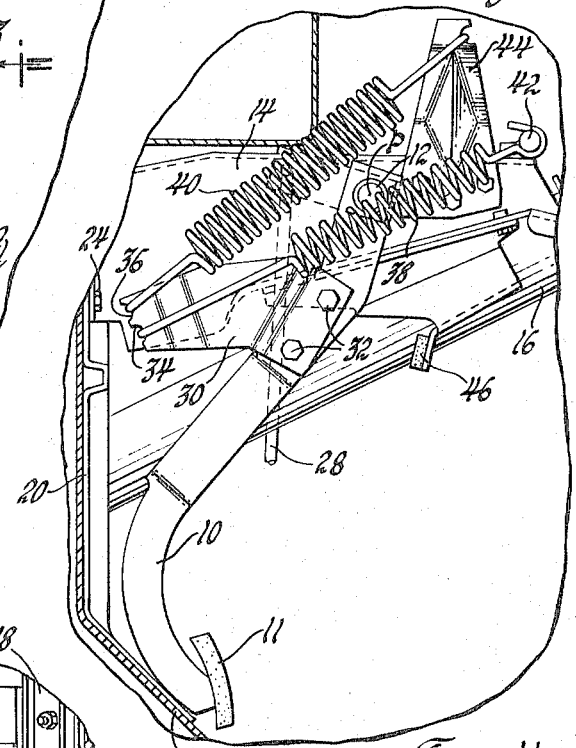
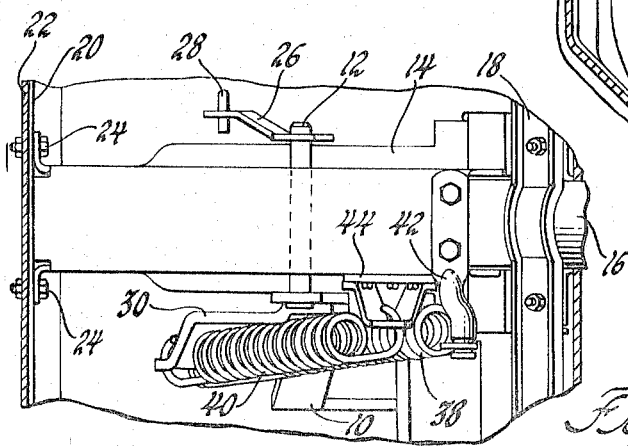

3,302,763
CLUTCH PEDAL WITH SPRING ASSIST
Marvin T. Wobrock, Detroit, Mich., assignor to General Motors Corporation, Detroit, Mich., a corporation of Delaware
Filed Nov. 6, 1964, Ser. No. 409,488
3 Claims. (Cl. 192—89)

This invention relates to a foot pedal control mechanism for a motor driven vehicle and more particularly to a spring device for assisting the vehicle operator in rotating the clutch foot pedal between a clutch engaged position and a clutch disengaged position.

The novel application of springs of this device is intended primarily for a clutch pedal but may be readily applicable to other types of foot pedals.

There are various clutch pedal assist devices currently in use which utilize a spring mechanism for assisting the clutch pedal operation. The commonly used type has a pair of opposed springs attached to the clutch pedal in which one spring is an over-center spring which resists pivotal movement of the clutch pedal from a clutch engaged position to a clutch disengaged position until the effective force line of the spring passes over the center of rotation of the clutch pedal at which time the effective spring force changes from a resistance to such rotation to an aid in further rotation of the clutch pedal to a clutch disengaged position. The other spring balances the over center spring during initial rotation of the clutch pedal against the initial over-center spring's biasing action and combines with the over-center spring in the final portion of rotation of the clutch to the disengaged position. Such spring systems require varying foot pressures to control movement of the clutch pedal due mainly to the change of direction of the effective force of the over-center spring.

It is an object of this invention to provide a pair of balanced springs to assist in clutch pedal operation in which a first spring serves to continuously assist clutch pedal depression to a clutch disengaged position and a second spring serves to continuously assist return of the pedal to the clutch engaged position, thereby providing a control system in which a uniform foot pressure is required to move the clutch pedal between the clutch engaged and clutch disengaged position.

A further object of this invention is to provide a pair of balanced springs to assist clutch pedal movement in which neither spring passes over the center of rotation of the clutch pedal.

Another object of this invention is to provide a set of balanced springs that provide a substantially uniform resistance to applied foot pressure on the clutch pedal pad for movement from a clutch engaged position to a clutch disengaged position.

These and other objects of this invention may be readily seen by reference to the following specification and drawings wherein:

FIGURE 1 is a side view of a vehicle clutch pedal utilizing the balance spring device of this invention.

FIGURE 2 is a view taken substantially along the line 2—2 of FIGURE 1 illustrating the manner in which the balance springs are mounted.

FIGURE 3 is a view taken substantially along the line 3—3 of FIGURE 1 illustrating the manner in which the clutch pedal and the assist spring are mounted relative to the steering column.

FIGURE 4 is a side view of the clutch pedal in the fully depressed position showing the position of the balance springs.

Referring now to the drawings, as best seen in FIGURES 1 and 4, a clutch pedal 10 has one end rigidly secured to one end of a clutch pedal shaft 12 which is journaled for rotation in the mounting bracket 14 of the clutch pedal assembly. A pedal pad 11 is fixed to the lower end of the clutch pedal 10 for receiving manual foot pressure in the direction of arrow A to cause clockwise rotation of the clutch pedal. The mounting bracket 14 is secured to the steering column 16 by a clamp assembly 18 and to the fire wall 20 of the vehicle body 22 by bolts 24 or other suitable means.

The other end of the clutch pedal shaft 12 has a clutch pedal push rod lever 26 rigidly secured thereto. Pivotally secured to the clutch pedal push rod lever 26 is the clutch push rod 28 which is effectively connected through normal linkages to a conventional vehicle clutch 29 for control thereof. As the clutch pedal 10 is rotated about the clutch pedal shaft 12 from its normal or clutch engaged position, as shown in FIGURE 1, to its depressed or clutch disengaged position, as shown in FIGURE 4, the clutch pedal push rod lever 26 will also rotate and move the clutch push rod 28 which, acting through linkages, causes the vehicle clutch 29 to disengage by depression of the clutch springs 31 which normally bias the clutch into engagement. Foot pressure applied in the direction of arrow A of FIGURE 1 to the clutch pedal pad 11 must overcome the spring biasing action or thrust of the clutch springs 31 which normally increase as the clutch 29 is moved to disengaged position.

The clutch pedal operation and structure thus far described is conventional and well known in the art and constitutes no part of this invention other than the manner in which the movement of the clutch pedal is controlled or assisted by the novel spring device of this invention.

The novel spring structure of this invention includes an extension arm 30 secured to the clutch pedal 10 by bolts 32 or other suitable means. The extension arm 30 has a pair of notches 34, 36 for anchoring the respective ends of a return spring 38 and the balance spring 40, respectively. The other end of return spring 38 is anchored to an anchor bracket 42 which is secured to the mounting bracket 14 by bolts or other suitable means. The other end of the balance spring 40 is anchored to anchor bracket 44 which is secured to the mounting bracket 14 by bolts or other suitable means.

As viewed in FIGURE 1, the return spring 38 biases the clutch pedal 10 counterclockwise about the clutch pedal shaft 12 into engagement with a bumper stop 46 which limits counterclockwise rotation of the clutch pedal 10. The bumper stop 46 is secured to the mounting bracket 14 by bolts or other suitable means. The clockwise rotation of the clutch pedal is limited by the vehicle body 22, as seen in FIGURE 4.

The center lines of return spring 38 and balance spring 40, as seen in FIGURE 1 and in FIGURE 4, show that these springs at no time pass over the center of rotation of the clutch pedal 10 (the center of rotation is the center P of clutch pedal shaft 12) within the limits of rotation of the clutch pedal.

The torsional force of the springs 38 and 40 is determined by effective linear force of the respective spring along the center line of that spring multiplied by the lever arm or, in other words, shortest distance from the center of pivot P to the line of force or center line of the spring. Thus, when the clutch pedal 10 is in the clutch engaged position, shown in FIGURE 1, the return spring 38 and the clutch springs, acting through clutch push rod 28, bias the clutch pedal to that position and the balance spring 40, having its center line close to the center of pivot, exerts a small torsional force urging the clutch to disengaged position. When foot pressure is applied to the clutch pedal at the pad 11 in the direction of the arrow A, the clutch spring thrust plus return spring force must be overcome to rotate the clutch pedal toward the clutch disengaged position. During such rotation, the effective force of the return spring 38 is decreased as the center line of the spring approaches the pivot point P, the effective force of the balance spring 40 increases as its center line is moved away from the pivot point P and the clutch spring biasing force increases as the clutch is disengaged. By practicing this invention, the balance spring 40 and return spring 38 provide a net torsional force acting on the clutch pedal which combined with clutch spring biasing force provides a clutch control system in which a uniform foot pressure will move the clutch pedal between engaged and disengaged positions.

While the preferred embodiment of the present invention has been shown and explained, it is obvious that many structural details may be altered without departing from the spirit and scope of the following claims.

I claim:

1. In a motor vehicle having a clutch, said clutch having an engaged position and a disengaged position and being movable therebetween, a control mechanism for controlling movement of said clutch between said positions, said control mechanism including a mounting bracket secured to said motor vehicle for supporting said control mechanism, a clutch push rod operatively connected to said clutch for moving said clutch between said positions, a clutch pedal shaft rotatively mounted on said mounting bracket, a clutch pedal push rod lever secured to one end of said shaft for rotation therewith, said clutch push rod pivotally connected to said push rod lever for effecting movement of said clutch by rotation of said shaft, a clutch pedal rigidly secured to said shaft for rotation therewith, a stop secured to said mounting bracket for limiting rotative movement of said clutch pedal in one direction, a return spring having one end anchored to said mounting bracket and the other end connected to said clutch pedal, said return spring being under tension for continuously biasing said clutch pedal to rotate in said one direction, a balance spring having one end anchored to said mounting bracket and the other end connected to said clutch pedal, said balance spring being under tension for continuously biasing said clutch pedal to rotate in a direction opposite from said one direction.

2. In combination, a vehicle body, a manually operable pedal rotatably mounted in said body, said pedal having a normal position and a depressed position and being movable therebetween, said pedal contacting said body at said depressed position for limiting rotational movement in one direction, a pedal control mechanism mounted in said body and operatively connected to said pedal, said control mechanism including a pedal stop in the plane of rotation of said pedal for limiting rotational movement of siad pedal in the direction opposite from said one direction at said normal position, an extension arm fixed to said pedal for movement therewith, a first spring means for applying a biasing force for urging said pedal into contact with said stop, said first spring means having one end secured to said body, the other end secured to said extension arm, and the center line thereof remaining to one side of the center of rotation of said pedal at all times during rotation of said pedal between said positions, a second spring means having one end secured to said body for applying a biasing force for urging said pedal away from said stop toward said depressed position, the other end secured to said extension arm, and the center line thereof never crossing the center of rotation of said pedal during rotation of said pedal between said positions, a third spring means operably connected to said pedal for applying a biasing force for urging said pedal toward said normal position, said third spring means increasing such biasing force as said pedal moves toward said depressed position, and the combined biasing forces of said spring means providing a uniform resistance at all positions between said normal and said depressed position to externally applied force tending to move said pedal toward depressed position.

3. In combination in a motor vehicle clutch, a clutch having an engaged posiiton and a disengaged position and being movable therebetween, first spring means for applying a thrust to said clutch for biasing said clutch toward said engaged position, the effective thrust of said first spring means increasing as said clutch moves from said engaged position to said disengaged position, a control mechanism for moving said clutch between said positions including a mounting bracket secured to said motor vehicle for supporting said control mechanism, a clutch push rod operatively connected to said clutch for effecting movement thereof between said positions, a clutch pedal shaft rotatably mounted on said mounting bracket, a cluatch pedal push rod lever secured to one end of said shaft for rotation therewith, said clutch push rod pivotally connected to said push rod lever, a clutch pedal rigidly secured to said shaft for rotation therewith and having positions correspoding to said clutch engaged position and said clutch disengaged position of said clutch, stop means for limiting rotative movement of said clutch pedal between said positions, a return spring having one end anchored to said mounting bracket and the other end connected to said clutch pedal, said return spring being continuously effective to bias said clutch pedal toward said clutch engaged position, a balance spring having one end anchored to said mounting bracket and the other end connected to said clutch pedal, said balance spring being continuously effective to bias said clutch pedal toward said clutch disengaged position, and the biasing forces applied to said pedal providing a net biasing force on said pedal which varies with the position of said pedal for effectively counteracting variations of thrust of said first spring means irrespective of the position of said pedal between said positions whereby the manual pressure required to actuate the clutch pedal remains constant as said clutch pedal is moved between the clutch engaged position and the clutch disengaged position.

References Cited by the Examiner

UNITED STATES PATENTS

| | | | |
|---|---|---|---|
| 3,009,554 | 11/1961 | Frank | 192—99 |
| 3,187,867 | 6/1965 | Sink | 192—89 |
| 3,199,366 | 10/1965 | Herrington | 192—99 X |

DAVID J. WILLIAMOWSKY, *Primary Examiner.*

BENJAMIN W. WYCHE, III, *Examiner.*